(12) United States Patent
Tuomola

(10) Patent No.: US 10,468,709 B2
(45) Date of Patent: Nov. 5, 2019

(54) NON-PRISMATIC ELECTROCHEMICAL CELL

(71) Applicant: TANKTWO OY, Vantaa (FI)

(72) Inventor: Juha Tuomola, Vantaa (FI)

(73) Assignee: TANKTWO OY, Vantaa (FI)

( * ) Notice: Subject to any disclaimer, the term of this patent is extended or adjusted under 35 U.S.C. 154(b) by 193 days.

(21) Appl. No.: 15/568,147

(22) PCT Filed: Apr. 18, 2016

(86) PCT No.: PCT/EP2016/058536
§ 371 (c)(1),
(2) Date: Oct. 20, 2017

(87) PCT Pub. No.: WO2016/169887
PCT Pub. Date: Oct. 27, 2016

(65) Prior Publication Data
US 2018/0090781 A1    Mar. 29, 2018

(30) Foreign Application Priority Data
Apr. 20, 2015    (GB) .................................. 1506667.3

(51) Int. Cl.
*H01M 2/02*    (2006.01)
*H01M 2/30*    (2006.01)
*H01M 10/04*    (2006.01)
*H01M 10/42*    (2006.01)

(52) U.S. Cl.
CPC ....... *H01M 10/0431* (2013.01); *H01M 2/022* (2013.01); *H01M 2/024* (2013.01); *H01M 2/305* (2013.01); *H01M 10/4257* (2013.01); *H01M 2002/0205* (2013.01); *H01M 2220/20* (2013.01)

(58) Field of Classification Search
CPC .................................................. H01M 10/0431
See application file for complete search history.

(56) References Cited

U.S. PATENT DOCUMENTS

2006/0127762 A1    6/2006 Gyenes et al.

FOREIGN PATENT DOCUMENTS

| JP | 2001093579 A | 4/2001 |
|----|--------------|--------|
| WO | 2015/036437 A1 | 3/2015 |

OTHER PUBLICATIONS

International Search Report, dated Jun. 20, 2016, and Written Opinion issued in international Application No. PCT/EP2016/058536.
Combined Search and Examination Report, dated Mar. 10, 2016, issued in priority GB Application No. 1506667.3.

*Primary Examiner* — Matthew J Merkling
(74) *Attorney, Agent, or Firm* — Saul Ewing Arnstein & Lehr LLP

(57) ABSTRACT

A method of manufacturing a non-prismatically shaped electrochemical cell. An elongate, substantially planar electrode strip is provided, having an anode on one of its major surfaces, a cathode on the other of its major surfaces, and a separator between the anode and the cathode, the strip tapering in its plane along the length of the strip. The electrode strip is rolled up along its length from its wider end to its narrower end. Also provided are a non-prismatic cell, and an electrode strip and electrode roll for use in such a cell.

18 Claims, 5 Drawing Sheets

NON-PRISMATIC ELECTROCHEMICAL CELL

CROSS REFERENCE TO RELATED APPLICATIONS

This application claims the priority of International Application No. PCT/EP2016/058536, filed on Apr. 18, 2016, which claims priority to GB Application No. 1506667.3, filed Apr. 20, 2015, the entire contents of each of which are fully incorporated herein by reference.

TECHNICAL FIELD

The invention relates to electrochemical cells. In particular, the invention relates to non-prismatic electrochemical cells using a "jelly roll" design, methods for manufacturing such, and electrode strips and rolls for use in such cells.

BACKGROUND

Rechargable battery cells are formed from an anode, a cathode, a separator, and an electrolyte. The anode and cathode react to produce the electric current, with the separator preventing unwanted contact between layers, and the electrolyte allowing the movement of ions between the anode and cathode.

The most common cell geometry for rechargeable battery cells is a wound design. The anode, separator, and cathode are formed into long rectangular strips and placed on top of each other to form an "electrode strip". They the electrode strip is wound spirally to form an electrode roll, also called a "jelly roll" or "Swiss roll". A cylindrical cell is achieved naturally, and other prismatic cells can be achieved by flattening the jelly roll, or by wrapping the roll around a shaped core. Terminal tabs are added to the anode and cathode, which protrude from the roll to form the terminals of the cell. The electrolyte is added in liquid or gel form to complete the cell.

SUMMARY

According to an aspect of the present invention, there is provided a method of manufacturing a non-prismatically shaped electrochemical cell. An elongate, substantially planar electrode strip is provided, having an anode on one of its major surfaces, a cathode on the other of its major surfaces, and a separator between the anode and the cathode, the strip tapering in its plane along the length of the strip. The electrode strip is rolled up along its length from its wider end to its narrower end. The rolled electrode strip is provided within a non-prismatically shaped shell having a shape corresponding substantially to the rolled up electrode strip.

According to a further aspect, there is provided an electrochemical cell. The electrochemical cell comprises an electrode roll, and a non-prismatically shaped shell having a plurality of external electrical contact points and a shape substantially corresponding to the electrode roll. The electrode roll comprises an electrode strip, the electrode strip having been formed into a roll with the wide end on the inside of the roll, and the narrow end on the outside of the roll. The electrode strip is elongate and substantially planar and has an anode on one of its major surfaces, a cathode on the other of its major surfaces, and a separator between the anode and the cathode, the strip tapering in its plane along the length of the strip. The electrode roll is located inside the non-prismatically shaped shell and the anode and the cathode are connected to respective contact points of the non-prismatically shaped shell.

According to a further aspect, there is provided a method of manufacturing a non-prismatically shaped electrochemical cell. An elongate, substantially planar electrode strip is provided, having an anode on one of its major surfaces, a cathode on the other of its major surfaces, and a separator between the anode and the cathode, the strip tapering in its plane along the length of the strip. The electrode strip is rolled up along its length from its wider end to its narrower end.

According to a further aspect, there is provided an electrode strip for use in a non-prismatically shaped electrochemical cell. The electrode strip is elongate and substantially planar and has an anode on one of its major surfaces, a cathode on the other of its major surfaces, and a separator between the anode and the cathode, the strip tapering in its plane along the length of the strip.

According to a further aspect, there is provided an electrode roll for use in a non-prismatically shaped electrochemical cell. The electrode roll comprises the electrode strip of the above aspect, the electrode strip having been formed into a roll with the wide end on the inside of the roll, and the narrow end on the outside of the roll.

According to a further aspect, there is provided an electrochemical cell. The electrochemical cell comprises the electrode roll of the above aspect, and a non-prismatically shaped shell having a plurality of external electrical contact points and a shape substantially corresponding to the electrode roll. The electrode roll is placed inside the non-prismatically shaped shell and the anode and the cathode are connected to respective contact points of the non-prismatically shaped shell.

Further embodiments are described in the appended claims.

DETAILED DESCRIPTION

Figure 1:
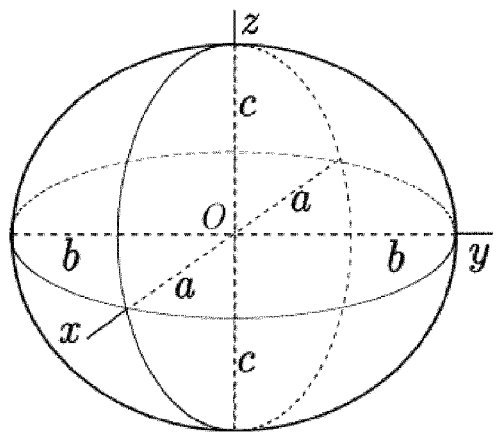
FIG. 1 shows an ellipsoid.

For the sake of clarity, the following properties of ellipsoids will now be defined with reference to FIG. 1:

Prism: A shape two congruent parallel bases joined by other faces such that all cross sections parallel to the bases are congruent to the bases. Note that this definition includes the cases where the parallel bases are not polygons—e.g. where they are circles (forming a cylinder), or more complex curved shapes.

Non-prismatic shape: A shape which is not a prism.

Ellipsoid: A 3-dimensional shape defined by the equation below, where the x, y, and z axes are aligned with the principal axes of the ellipsoid. Any cross section of an ellipsoid is an ellipse.

$$\frac{x^2}{a^2} + \frac{y^2}{b^2} + \frac{z^2}{c^2} = 1$$

Spheroid (also known as an ellipsoid of revolution): An ellipsoid where any two of a, b, and c are equal. A spheroid will have a circular cross section along one axis. A sphere is a special case where all three of a, b, and c are equal.

Solid of revolution: A solid figure obtained by rotating a 2-dimensional shape around an axis which is in the plane of the shape.

Principal axis: One of the axes which define the ellipsoid. Each ellipsoid can be described by three perpendicular principal axes, one of which will be the greatest diameter of the ellipsoid, and one of which will be the shortest diameter of the ellipsoid.

In the case of a spheroid, two of the principal axes will be equal in length, and may be arbitrarily placed on a plane at the equator of the ellipsoid. In the case of a sphere, all of the principal axes are equal in length, and the orientation of the axes is arbitrary. a, b, and c are the lengths of each semi-principal axis (i.e. half the length of each principal axis).

The term "trapezoid" is used herein to refer to a quadrilateral with one pair of parallel sides (often called a "trapezium" in British English). An isosceles or symmetric trapezoid is one where the non-parallel sides have the same length, and a right trapezoid or semi-trapezoid is one in which one of the non-parallel sides is at a right angle to the parallel sides. For the purposes of this disclosure, shapes having two pairs of parallel sides (i.e. parallelograms) are not considered trapezoids. The "base" of a trapezoid is used herein to refer to the longer of the parallel sides, and the "top" is used to refer to the shorter of the parallel sides.

Except as noted above with respect to trapezoids, any general geometric term is considered to include any applicable special cases, e.g. spheres are a type of ellipsoid, and circles are a type of ellipse.

A non-prismatic cell is proposed below, for example for use in battery units such as those disclosed in GB2518196. While it would be possible to insert a standard jelly roll into a non-prismatic case, this would result in a large amount of wasted space. Therefore, a new geometry is proposed to allow a larger cell to be fit inside a non-prismatic case. Instead of a rectangular strip, a strip where the width decreases along the length of the strip is wound, with the thicker end forming the centre of the jelly roll. If the jelly roll is wound around a circular cross section, it will form a solid of revolution (e.g. a cone, a spheroid, or some other shape having rotational symmetry about the axis of rolling). If the jelly roll is wound around a shaped core, other shapes can be achieved, e.g. elliptical cross sections, or more complex curves. A jelly roll with a circular cross section may be altered into a jelly roll with an elliptical cross section by compressing it in a direction perpendicular to the axis of rolling.

Figure 2:
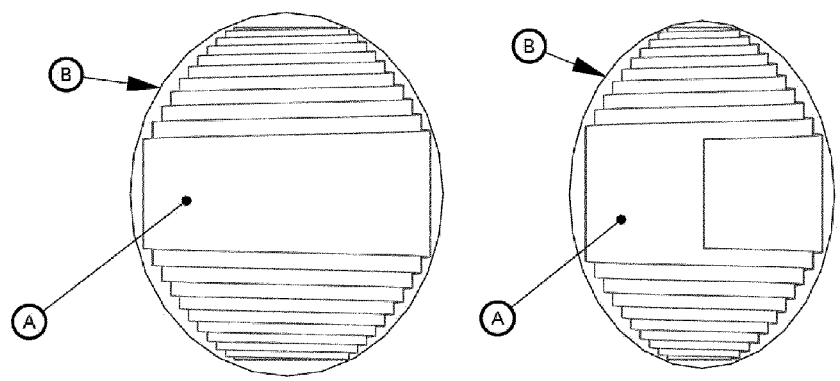
FIG. 2 shows an electrochemical cell according to an embodiment.
Figure 2:
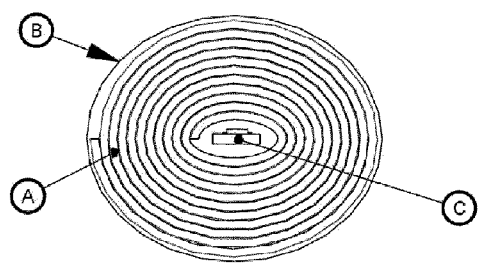

An exemplary cell using an isosceles trapezoidal electrode strip is shown in FIG. 2. As can be seen from the figure, the jelly roll more closely approximates the shape of the ellipsoid shell than would be achieved by a cylindrical jelly roll, though the fit is not perfect as the curve formed by rolling up a trapezoid is not an ellipse. Using a non-prismatically shaped jelly roll allows a much higher fill ratio than would be achieved by a cylindrical jelly roll, for example to 75% to 90% of the internal space of the battery.

Figure 3:
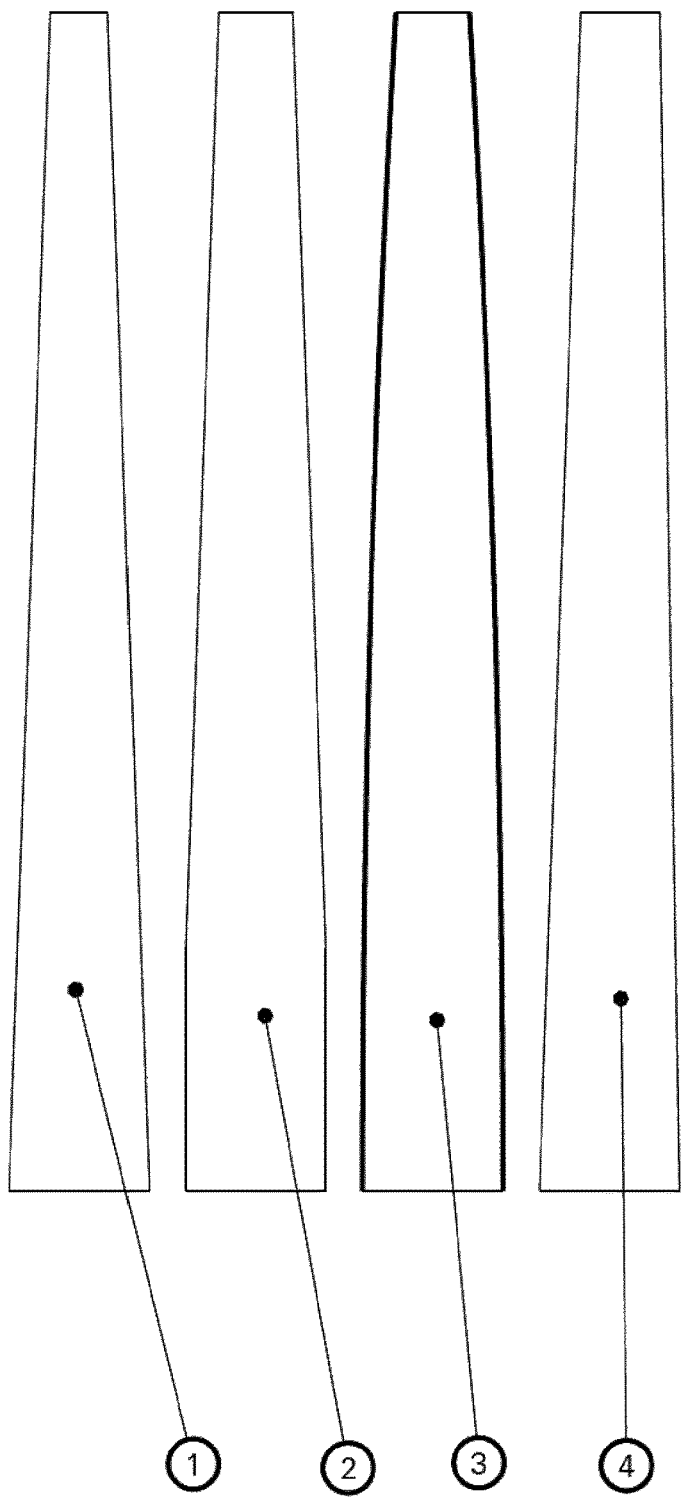
FIG. 3 shows exemplary electrode strips according to an embodiment.

FIG. 3 shows possible shapes for the electrode strips prior to winding. 1 is an isosceles trapezoid. 2 is a partial trapezoid which can be considered as an isosceles trapezoid joined to a rectangle at the base. 3 is a shape with two straight parallel ends and sides which curve convexly inwards from the base to the top. Choosing a suitable curve for such a shape allows the required shape to me more closely approximated by the final jelly roll. A good approximation to an ellipsoid will generally be obtained if the curve is convex (as concave curves will move away from the ellipse compared to a trapezoid electrode strip), and the width of the strip decreases along its length. A non-symmetric electrode strip (such as the non-isosceles trapezoid shown in 4) may also be used, for example to make an "egg shaped" roll, or to give more clearance at one end of an ellipsoid to allow other components of the battery to be inserted within the casing. Partially concave strips may similarly be used to provide space for other components. In general, an electrode strip where the thin end is equal to or less than half the width of the wide end will provide a reasonable fit for an ellipsoid shell.

The cell will generally also comprise control circuitry and connections to external contact pads. The configuration of the jelly roll may be adjusted in order to allow these to fit within the casing. For example, the jelly roll may be wrapped in such a way as to leave a gap in the middle sufficient to insert the control circuitry (C in FIG. 2), or the control circuitry and contacts may be inserted in regions where the jelly roll does not fit well to the shell. In order to create a gap in the middle of the jelly roll, the roll may be rolled around a core, and the core removed once the roll is complete.

Figure 4:
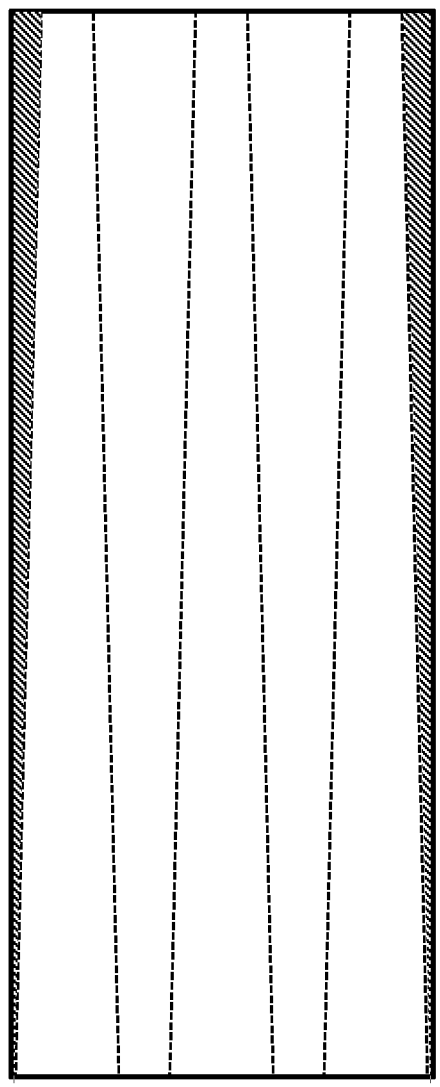
FIG. 4 shows how electrode strips may be cut from a sheet according to an embodiment

Electrode strips according to the prior art are generally manufactured by forming a long roll of each of the cathode, anode, and separator, cutting the roll to the required width, then cutting lengths from each roll and placing them together to form the electrode strip. This method would need to be modified in order to form a non-rectangular electrode strip. One possibility is to trim the rectangular strips of cathode/anode/separator into the required shape. However, this would result in significant waste. Another possibility is to cut each roll to the required length first giving a sheet which is long enough for a single cell, but the width of several cells, and then cut the required shapes from this sheet. This allows the strips to be tessellated as shown in FIG. 4, in order to reduce the waste. In the case shown in FIG. 4, for isosceles trapezoidal strips, only the areas shaded with diagonal lines are wasted. For strips such as 2 and 3 in FIG. 3, which do not exactly tessellate, there will be some waste between each strip.

To construct a complete cell, the jelly roll is provided into an non-prismatic shell. For example, the jelly roll may be inserted into the shell by forming the shell around the jelly roll, e.g. overmoulding or attaching segments of the shell around the jelly roll, or the jelly roll may be inserted into a completed shell. The shell has at least two external electrical contact points, and the anode and cathode of the jelly roll are connected to respective contact points. Power can then be provided from the cell via the contact points.

A controller may be used, e.g. to provide various safety features such as current limitation, voltage monitoring, and emergency disconnection, or to alter which contact points the anode and cathode are connected to (e.g. as described in GB2518196). The anode and cathode are connected to the controller, and the controller is then connected to the contact points, instead of the anode and cathode being connected directly to the contact points.

Figure 5:
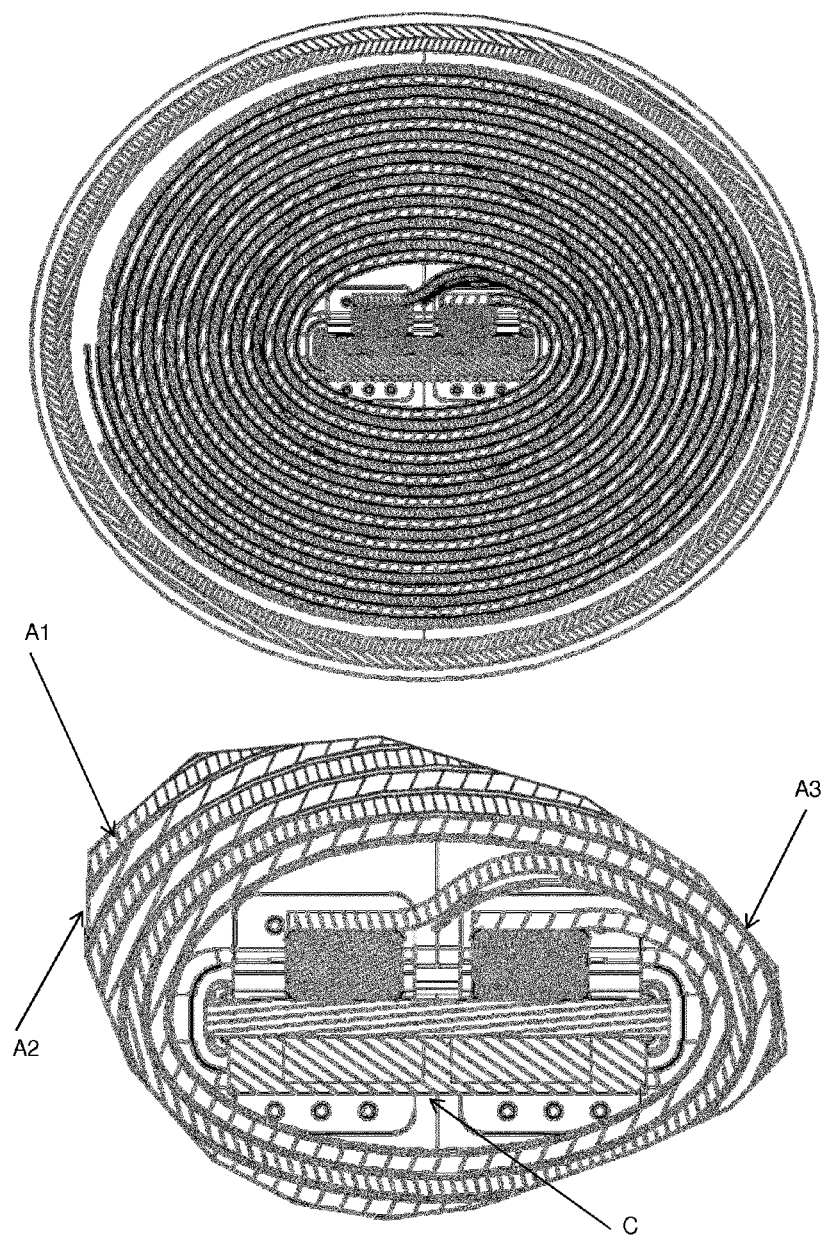
FIG. 5 is a cross sectional view of an electrochemical cell according to an embodiment.

The controller may be inserted into the shell, e.g. in the space left between the jelly roll and the shell, or the jelly roll may be formed with an empty region in the centre (e.g. by rolling it around a spindle sized to leave such a region), and the controller may be placed into the empty region as shown in FIG. 5. Alternatively, the jelly roll may be rolled around the controller itself. The controller may be mounted on a printed circuit board (PCB), or it may comprise multiple PCBs which are connected.

FIG. 5 shows a detailed cross section view of an electrochemical cell where the jelly roll has a controller positioned in the centre. The jelly roll is shown in detail as comprising the anode A1, cathode A2, and separator A3. The lower part of FIG. 5 is an expanded view of the centre of the upper part of the figure.

The anode and cathode may be connected to the controller by wires, like in current batteries, or alternatively the anode A1 and the cathode A2 may be directly connected to contact points of the controller C as shown in FIG. 5. This is a particularly attractive solution if the jelly roll is rolled around the controller.

Figure 6:
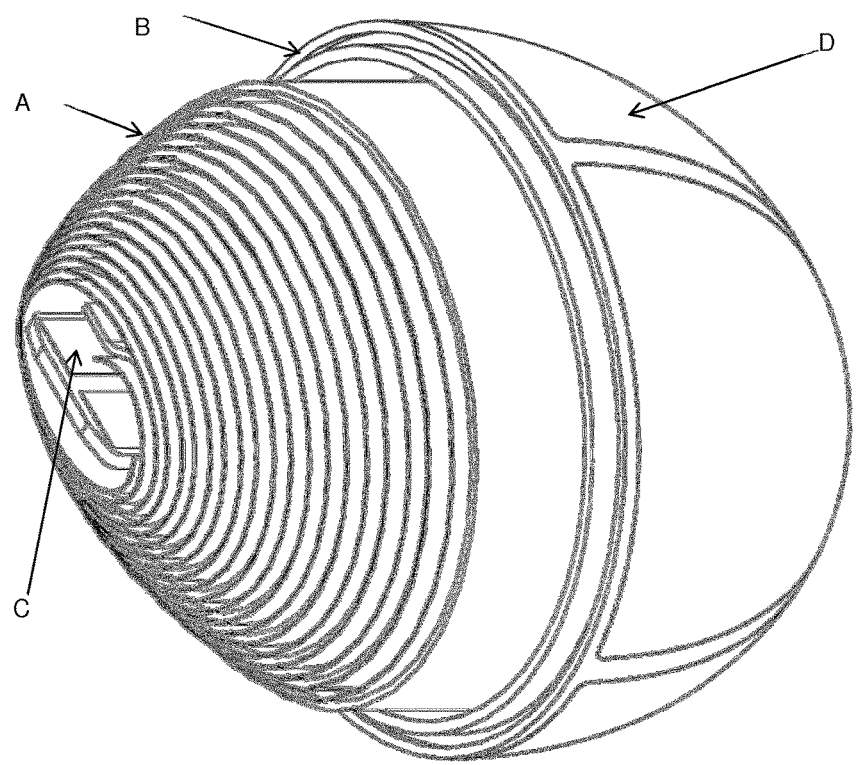
FIG. 6 is a cut-away view of an electrochemical cell according to an embodiment.

FIG. 6 shows a cutaway of a completed electrochemical cell with one half of the shell B removed. It can be clearly seen that the jelly roll A fits much better within the shell B than would be achieved by any cylindrical roll. The connections between the controller C and the contact points D are not shown.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of manufacturing a non-prismatically shaped electrochemical cell, the method comprising:
   providing an elongate, substantially planar electrode strip having an anode on one of its major surfaces, a cathode on the other of its major surfaces, and a separator between the anode and the cathode, the strip tapering in its plane along the length of the strip; and
   rolling the electrode strip up along its length from its wider end to its narrower end;
   providing the rolled electrode strip within a non-prismatically shaped shell having a shape corresponding substantially to the rolled up electrode strip.

2. A method according to claim 1, wherein the rolled electrode strip fills the shell with a fill ratio greater than 75%.

3. A method according to claim 1, wherein the shell is substantially ellipsoidal.

4. A method according to claim 1, and comprising connecting the anode and the cathode to a controller and connecting the controller to each of the contact points, wherein the controller is configured to control electrical connections between the anode and cathode and external electrical contact points of the shell.

5. A method according to claim 4, and comprising rolling the electrode strip around a core, removing the core in order to leave an empty region along the axis of the roll, and placing the controller in the empty region.

6. A method according to claim 4, and comprising rolling the electrode strip around the controller.

7. A method according to claim 1, wherein the electrode strip is rolled to form a jelly roll with a substantially elliptical cross section perpendicular to the axis of the roll.

8. A method according to claim 7, wherein the electrode strip is rolled to form a jelly roll with a substantially circular cross section perpendicular to the axis of the roll.

9. A method according to claim 1, wherein the planar cross-sectional shape of the electrode strip is:
   a trapezoid;
   an isosceles trapezoid;
   a shape consisting of a rectangle region at the wider end, and a trapezoid between the rectangle and the narrower end;
   a shape having convexly curved edges connecting the wider end and the narrower end, wherein the curves are such that at any region along the length of the strip the width of the strip is either constant or decreasing towards the narrow end.

10. A method according to claim 1, wherein the width of the narrower end of the electrode strip is less than half of the width of the wider end of the electrode strip.

11. An electrochemical cell comprising:
   an electrode roll comprising an electrode strip, the electrode strip being elongate and substantially planar and having an anode on one of its major surfaces, a cathode on the other of its major surfaces, and a separator between the anode and the cathode, the strip tapering in its plane along the length of the strip, the electrode strip having been formed into a roll with the wide end on the inside of the roll, and the narrow end on the outside of the roll;
   a non-prismatically shaped shell having a plurality of external electrical contact points and a shape substantially corresponding to the electrode roll, the electrode roll being located inside the shell.

12. An electrochemical cell according to claim 11, wherein the major surfaces of the electrode strip are both any one of:
   a trapezoid, with the wider end and narrower end of the electrode strip being parallel sides of the trapezoid;
   an isosceles trapezoid, with the wider end and narrower end being parallel sides of the trapezoid;
   a strip consisting of a rectangular region proximate to the wider end, and a trapezoidal region between the rectangular region and the narrower end, with the narrower end and an edge of the rectangular region being parallel sides of the trapezoid;
   a strip having convexly curved edges connecting the wider end and the narrower end, wherein the curves are such that at any region along the length of the strip the width of the strip is either constant or decreasing towards the narrow end.

13. An electrochemical cell according to claim 11, the electrode roll having an approximately elliptical cross section perpendicular to the axis of the roll.

14. An electrochemical cell according to claim 13, the electrode roll having an approximately circular cross section perpendicular to the axis of the roll.

15. An electrochemical cell according to claim 11, the electrode roll having an empty region at the axis of the roll.

16. An electrochemical cell according to claim 11, and comprising a controller, wherein the anode and cathode are connected to the controller, and the controller is connected to each of the contact points, wherein the controller is configured to control electrical connections between the anode and cathode and the contact points.

17. An electrochemical cell according to claim 16, wherein the controller is located inside an empty region at the axis of the electrode roll.

18. An electrochemical cell according to claim 17, wherein portions of the anode and cathode at the wide end of the electrode strip are connected directly to respective contact points of the controller.

\* \* \* \* \*